Figure 1:
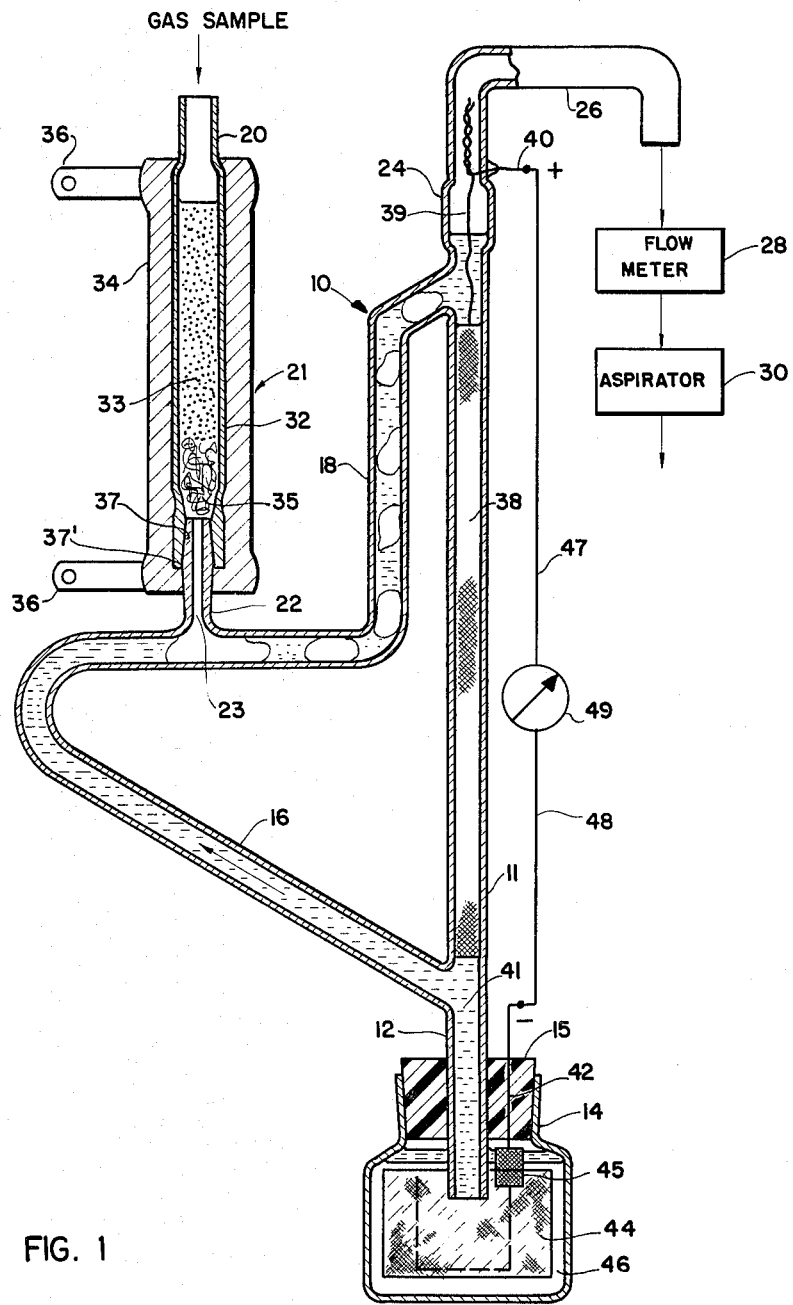

INVENTOR.
PAUL A. HERSCH

INVENTOR.
PAUL A. HERSCH

United States Patent Office 3,258,411
Patented June 28, 1966

3,258,411
METHOD AND APPARATUS FOR MEASURING THE CARBON MONOXIDE CONTENT OF A GAS STREAM
Paul A. Hersch, Fullerton, Calif., assignor to Beckman Instruments, Inc., a corporation of California
Filed June 11, 1964, Ser. No. 375,423
13 Claims. (Cl. 204—1)

This application is a continuation-in-part of my copending application Serial No. 258,239, filed February 13, 1963, now abandoned, entitled, Improvement in Gas Analysis, assigned to the same assignee as the present application.

This invention relates to gas analysis and, more particularly, to an improved galvanic monitoring process for the continuous analysis of traces of carbon monoxide in a sample of air or in other gases.

The present invention makes use of some of the principles and features disclosed in applicant's copending patent application, Serial No. 233,357, filed October 26, 1962, now abandoned. A number of methods are presently known by which carbon monoxide traces in a sample stream of air may be determined, making use of the well known fact that carbon monoxide is readily oxidizable by iodine pentoxide producing both carbon dioxide and iodine vapor. A number of chemical sensors for carbon monoxide are known by which either the carbon dioxide or the iodine, liberated in the reaction between carbon monoxide and iodine pentoxide, is determined. High sensitivities can be reached when the carbon dioxide of the reaction is made to decrease the electrical conductivity of a dilute solution of alkali or of an alkaline earth metal hydroxide in water. However, the more widely used technique is the absorption of ultraviolet or visible light by iodine. Also, optical methods have been used which measure the absorption by carbon monoxide itself in the infrared region of the spectrum. This technique fails, however, to reach ranges much below 50 volumes per million without going to the complications of very long optical paths, or using pressurized samples. It is also known how to determine iodine by means of amperometry and voltammetry. All these methods suffer from a considerable complexity of equipment, with the result that carbon monoxide is not being continuously monitored in many instances where an indication of the toxic gas, and especially its incipient emergence, is desirable in the interest of health and safety.

It is the principal object of the present invention to provide a relatively simple method and apparatus for measuring carbon monoxide continuously at low concentration levels.

Another object of the invention is to provide an electrochemical method and apparatus for measuring carbon monoxide which does not require continual or intermittent renewal of the electrolyte used therein.

An additional object of the invention is to provide a method and apparatus for the galvanic monitoring of carbon monoxide, i.e., the monitoring of carbon monoxide by an electrochemical process which does not require an external electromotive force.

Still a further object of the present invention is to provide a method and apparatus for measuring carbon monoxide wherein the conversion of the carbon monoxide into current is determined solely by Faraday's law, and is not affected by the geometry of the cell or by temperature. Thus, there is no need for calibration nor for the provision of a standard source of carbon monoxide in this invention as is required in conventional devices.

Immediately below is presented a summary of a principal aspect of the present invention, such summary being intended to provide a ready understanding of the invention but not to serve in any way as a definition of the scope of the invention which is set forth in the appended claims. According to such principal aspect of the invention, carbon monoxide in a sample gas stream is reacted with iodine pentoxide in a conversion chamber to produce iodine vapor. The iodine vapor is carried to a galvanic cell which is provided with an anode of active carbon or, in some cases silver or mercury, and a cathode of inert conductive material joined by a neutral buffered electrolyte. When the iodine passes over or along the cathode, the carbon anode is electrochemically oxidized. The free energy of oxidation of the carbon anode, coupled with the reduction of iodine to iodide, is converted into electrical energy. A current measuring device connected to the anode and cathode is thereby actuated. The current generated in the cell is a measure of the rate of supply of iodine and is related to this rate by Faraday's law. Since the rate of supply of iodine is proportional to the rate of supply of carbon monoxide in the sample, the current generated is also a measure of the rate of supply of carbon monoxide in the gas sample stream.

According to another aspect of the invention, quantities and concentrations of traces of certain oxygen compounds may be measured by first reacting them in an inert carrier stream with carbon to produce carbon monoxide. There after, the carbon monoxide is passed through a conversion chamber containing iodine pentoxide as described before, and thence to the galvanic cell of this invention to provide a measure of the quantity or concentrations of carbon monoxide and thus of the original oxygen compound, or the proportion of oxygen in a given weight of said compound.

Figure 2:
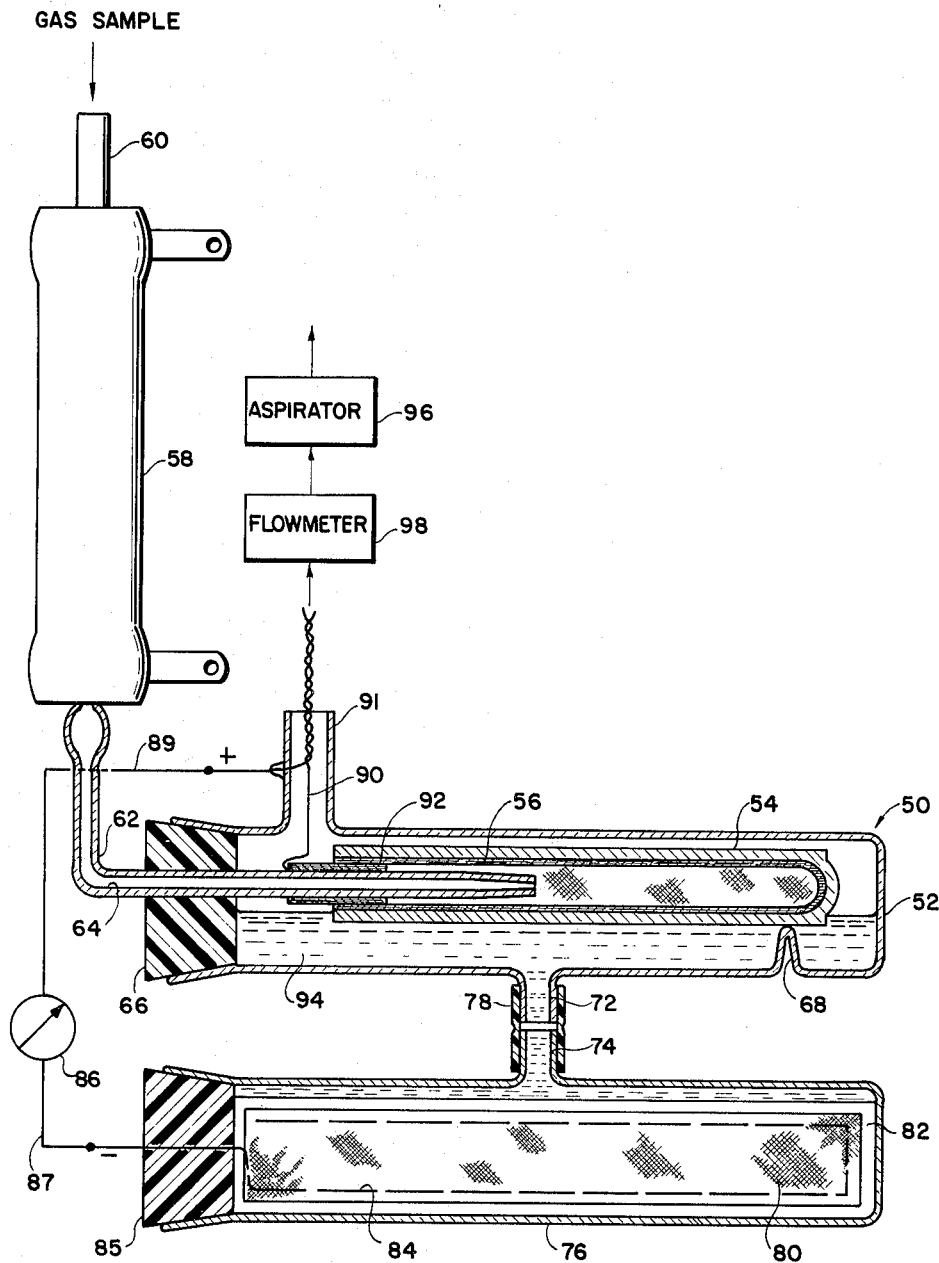

Other objects, aspects and advantages will become apparent from the following description taken in connection with the accompanying drawings wherein:

FIG. 1 is a partial sectional view of one embodiment of the invention wherein iodine vapor dissolves in the electrolyte of the galvanic cell before reaching the cathode of the cell; and FIG. 2 is a partial sectional view of another embodiment of the invention wherein iodine vapor impinges onto and passes along the cathode of the galvanic cell without first being dissolved in the electrolyte of the cell.

Referring now to the drawings in detail, FIG. 1 shows the apparatus of one embodiment of the invention which includes a glass cell or receptacle 10 having an elongated upright cathode section or compartment 11. The cathode section has its lower end connected through a downwardly extending stem 12 to a recessed anode section or compartment 14. A rubber stopper 15 secures the anode section 14 to the stem 12. The cathode compartment 11 of the receptacle at its upper and lower ends, respectively, connects through lateral openings to a conduit loop which includes an ascending tube 16 and an upright gas lift or bubble chain tube 18. A sampling duct 20 is connected to a conversion unit generally designated by numeral 21, the details of which will be described later. A duct 22 connects the bottom of the conversion unit to a lower portion of the gas lift tube 18. The apparatus immediately above the junction of the gas lift tube 18 and the upper end of the cathode compartment 11 is provided with a gas-liquid separation compartment 24. The upper end of the separation compartment 24 is coupled to a conduit 26 which connects in series to a flowmeter 28 and aspirator 30.

The conversion of carbon monoxide in the sample gas stream into iodine vapor takes place in the conversion unit 21. The unit consists of a central tube 32 surrounded by a cylindrical heater 34. The tube 32 contains granulated iodine pentoxide 33 or a mixture of small glass spheres (not shown) with powdered iodine pentoxide. A small amount of glass wool 35 near the bottom of the tube serves to support the granulated iodine pentoxide. The heater 34 may consist of a helix of nickel chromium wire (not shown) embedded in a ceramic or other heat resistant material. Lugs 36 on the heater are adapted to be connected to any suitable source of power to heat the conversion unit. The unit should be capable of holding a temperature of about 150° C. which is a suitable temperature for reacting the carbon monoxide in the gas sample with the iodine pentoxide to produce carbon dioxide and iodine vapor. In some cases, it may be advantageous to pre-treat the pentoxide in the conversion chamber by passing carbon monoxide-free air through the chamber at around 225° C., which treatment removes undesirable residual water and conditions the iodine pentoxide for subsequent quantitative reaction with carbon monoxide at about 150° C.

The lower end of tube 32 of the conversion unit has its internal surface 37 shaped as a tapered socket which mates with the conical shaped outer surface 37' of the duct 22. By this arrangement, duct 22 supports the conversion unit 21. The mating surfaces 37 and 37' preferably are ground to ensure a tight fit and prevent any leakages.

The cathode compartment 11 of the cell 10 houses a cathode 38 formed of an inert conductive material preferably rolled up to the configuration of a scroll. For example, the cathode may be a screen formed of a noble metal, such as platinum, or may be an inactive carbonaceous fibrous material such as graphite cloth or graphite felt. In the case of carbonaceous fibrous materials, such materials may be in the form of a scroll or a porous body transversing the compartment 11 and may be coated with a catalytically active metal such as platinum. A platinum wire 39 is attached at one end to the cathode 38 and at its other end to a terminal platinum wire 40 fused into the glass near the exit of the cell. The cell is sufficiently filled with electrolyte 41 so that when the electrolyte circulates the cathode is completely submerged in the electrolyte. In this embodiment of the invention, there is no direct contact between the gas stream and the cathode.

The anode compartment 14 has the shape of a bottle and carries a platinum wire 42 which extends through the stopper 15. It is highly desirable that the anode is not disturbed by the circulating electrolyte; this becomes possible with the design of the invention. As seen in FIG. 1, a piece of graphite cloth 44 is placed inside the anode compartment 14 and wire 42 is woven through the cloth and, therefore, is electrically connected thereto. A sludge of active carbon 46 made by working finely divided carbon into the cell electrolyte 41 fills a major portion of the anode compartment 14, with the cloth 44 almost buried. It is an essential feature of the invention that the carbon 46 be active, that is, it must participate in the chemical reaction occurring in the cell and not merely conduct electrically. It is desirable to attach a small piece of platinum screen 45 to the wire 42 where the wire emerges from the carbon sludge to facilitate the escape of hydrogen should a cathodic "charging" of the carbon become desirable after prolonged use. Without some emerging area of platinum, hydrogen bubbles can evolve inside the carbon bed and disrupt the bed during such charge. The part of the anode compartment 14 not occupied by carbon is partially filled with the cell electrolyte 41 as shown. Leads 47 and 48, respectively, electrically connect platinum wires 40 and 42 to a galvanometer 49 which constitutes the means for measuring current generated by the cell.

The carbon 46 should have a large, reactive surface and the particles, when forming a bed without compression, should have enough contact with each other to ensure conductive continuity throughout the bed.

The anode may also take the form of a body of carbonaceous fibrous material which is active, or inactive but in contact with active carbon, silver or mercury.

If desired, a silver or mercury anode rather than the active carbon anode 46 may be provided when there are high levels of carbon monoxide in the sample gas so that the current drain is high. The ability of a carbon anode to oxidize is limited and the anode may reach this limit early in continuous use if the drain is excessive. A silver anode, for all practical purposes, never gives out and, therefore, in some cases, may be more suitable. However, a cell utilizing a silver or mercury anode has the disadvantage that it generates a larger background signal than occurs when active carbon is used as the anode material.

A preferred electrolytic composition for use in cell 10 comprises:

|  | Mol/liter of solution |
|---|---|
| Potassium bromide | 3 |
| Potassium di-hydrogen phosphate | 0.1 |
| di-Sodium hydrogen phosphate | 0.1 |

The potassium salts may be replaced by the corresponding sodium or ammonium salts. Ammonium salts are more water soluble and would minimize the possibility of a salt crust forming at the site where gas enters the bubble chain tube 18.

The purpose of the phosphates in the electrolyte is to buffer off acidity which is a product of the anodic reaction in the cell. A slow build-up of acidity would tend to give rise to iodine from oxidation of iodide by oxygen of the air, and thus lead to a current signal in the absence of carbon monoxide.

In the operation of this apparatus the gas stream passing through the conversion unit 21 to the cell 10 provides the pumping action necessary to cycle the electrolyte solution between the bubble chain tube 18, where iodine vapor dissolves, to the cathode compartment 11 where iodine is reduced. The gas passes through the duct 22 in the form of a jet breaking up to give a chain of gas bubbles in tube 18, the bubbles being separated by short slugs of liquid as seen in FIG. 1. During the upward movement of the chain, the bubble-solution interface renews itself continually and turbulently ensuring an efficient dissolution of the iodine. The tube 18 should be of sufficient length so that when the bubbles reach the top of the tube all the iodine will be dissolved in the electrolyte. Such portion of the carbon dioxide formed in the conversion unit 21 as will dissolve in the buffered electrolyte will not affect the operation of the cell. The gas stream and liquid separate in compartment 24; the former exits through conduit 26 and aspirator 30 and the latter descends along the platinum cathode 38, surrendering to it all dissolved iodine for reduction. Thereafter, the electrolyte returns to the bubble chain 28 by action of the gas injected into the tube via duct 22.

The chemical reaction taking place in the conversion unit is:

$$5CO + I_2O_5 \rightarrow 5CO_2 + I_2$$

and the electrochemical reactions taking place in the galvanic cell are:

At the cathode $I_2 + 2e^- = 2I^-$
At the active carbon anode $$..C + H_2O = ..CO + 2H^+ + 2e^-$$

where ..CO indicates not carbon monoxide, but a surface oxide of carbon of ill defined formula. If the anode is either silver or mercury, the anodic reactions involve the oxidation of the metal to a metal halide. Negative ions, mostly bromide, migrate in the cell from the cathode toward the anode and positive ions, mainly potassium, in the opposite direction. As mentioned before, the presence of the two phosphates in the electrolyte provides a neutral buffer solution which prevents a change in pH which might otherwise occur by the build-up of hydrogen ions in or near the carbon bed. From the above equations, each mol of CO will move two-fifths of a faraday, that is $2/5 \times 96,500$ ampere-seconds (which equal $6.44 \times 10^8$ microampere-minutes of electricity) through the galvanometer 49. A gas stream of 100 ml./minute (at 20° C. and 1 atmosphere) carrying 1 volume per million of CO supplies $0.1 \times 10^{-6}/24$ mol CO/minute. The galvanic current is the product of these two figures, which is 2.68 microamperes. If the flow rate is $f$ ml./minute and the concentration $c$ volumes per million of CO, then the current is $0.0268fc$ microamperes. Thus, by merely noting the rate of flow of gas through the cell and measuring the current flowing in the circuit of the cell, a direct measurement of the concentration of carbon monoxide in the sample gas is provided.

The apparatus of this invention is preferably made from borosilicate type glass. It is important that the connection between the conversion unit 21 and the bubble chain tube 18 of the cell present to the sample gas stream the smallest possible surface area and that the surface of the inner portion of the duct 22 have a smooth texture and be of non-absorbent and non-adsorbent nature.

If duct 22 is not made short, narrow, and smooth, retention of iodine by the duct wall may result in a retarded and deceptively small current signal and thus, less carbon monoxide would be indicated than is actually in the sample, and the response would be unnecessarily slow. Duct 22 is provided with a smooth capillary channel 23 which provides a minimum amount of surface area so that the retention of the very reactive and highly adsorbable iodine is minimized. Care must be taken that when shutting down the apparatus no electrolyte is permitted to rise into the iodine pentoxide bed in the conversion unit 21.

It has been found that a salt crust may form at the point of the junction between duct 22 from the conversion unit and the bubble chain tube 18. Such a crust tends to retain iodine. In order to overcome this problem, a second embodiment of the invention, shown in FIG. 2 of the drawings, has been devised.

In the cell 50 of this embodiment, an outer compartment 52 is provided which receives an inner compartment or cathode section 54 formed of porous glass, porous ceramic, or any other porous material exposing to the interior of the compartment an inert surface. The inner walls of compartment 54 are clad with a cathode 56 which may consist of two layers of platinum screen separated by glass fiber paper, not shown, or a layer of inactive carbonaceous fibrous material. A conversion unit 58 is provided outside the cell and is of the same construction as unit 21 shown in FIG. 1, except that no cone-and-socket connection is used. A sample duct 60 enters the conversion unit and a duct 62 connects the other end of the unit to the internal portion of the compartment 54. Duct 62 is provided with a smooth capillary channel 64 to minimize the adsorption of iodine in the duct. The duct is secured to the outer compartment 52 of the cell by being frictionally fitted in a plastic stopper 66 closing the open end of the outer compartment. Duct 62 provides support for the open end of the compartment 54 while the closed end of the compartment is supported by a dent-in portion 68 of the outer compartment 52. By this arrangement the outer walls of porous compartment 54 are spaced from the inner walls of the outer compartment 52.

Compartment 52 has a downwardly extending stem 72 which communicates with a stem 74 of an anode section or compartment 76, the stems being secured together by a plastic sleeve 78. The anode compartment 76 receives a piece of graphite cloth 80 buried in a sludge of active carbon 82 which fills the major portion of the compartment. A platinum wire 84 is woven through the cloth 80 and extends through a plastic stopper 85 closing the open end of compartment 76. The wire is connected to a current measuring instrument 86 by a conductor 87. The instrument also is connected by conductor 89 to a platinum wire 90 which is fused into a stem 91 on the outer compartment 52. The end of wire 90 is connected to a multiple layer platinum screen 92 disposed between duct 62 and the cathode 56. An electrolyte 94, which may be of the same composition as the electrolyte 40 described in connection with the embodiment shown in FIG. 1, is provided in the outer compartment 52 of the cell in sufficient quantity to be partially in contact with the porous cathode compartment 54 in which it will be absorbed, and to completely fill the anode compartment 76. As in the embodiment of the invention illustrated in FIG. 1, the anode 82 may also be formed of silver or mercury.

An aspirator 96 is provided to draw the gas into the conversion unit 58 and thence through duct 62 to the cathode compartment 54. From there, the gas is drawn by the aspirator through the multiple layer screen 92 at the open end of compartment 54 and through stem 91 to a flowmeter 98.

The carbon monoxide in the gas sample produces iodine and carbon dioxide in the conversion unit 58. The gas stream is then ejected through the channel 64 into the cathode compartment 54 where it contacts the cathode 56. Since the cathode contacts the porous walls of compartment 54, which are soaked with electrolyte, it will be at least partly wet with electrolyte. Thus, the iodine dissolves in the electrolyte at the cathode and is immediately reduced to iodide. In this arrangement, in contrast to that shown in FIG. 1, the iodine vapor from the conversion unit passes directly to the cathode without being dissolved in the electrolyte anywhere else. Thus there is no problem of any localized formation of a salt crust in the cell holding back iodine. Having given up all its iodine to the cathode, the gas stream is drawn from compartment 54 through the platinum screen 92, stem 91 and flowmeter 98 by the aspirator 96.

Although only two embodiments of the invention have been disclosed herein for purposes of illustration, it will be understood that various changes can be made in the form, details and arrangement and proportions of the various parts in such embodiments without departing from the spirit and scope of the invention as defined by the appended claims.

What is claimed is:
1. In a galvanic monitoring process for determining carbon monoxide in a sample gas stream, the steps comprising:
    providing a porous cathode structure of inert conductive material and an anode selected from the group consisting of silver and mercury, said electrodes being separated by a porous member in contact with said cathode; joining the porous member and anode with a stagnant aqueous electrolyte so that while said cathode is wetted by the electrolyte there is substantially no movement of the electrolyte at the cathode;
    completely reacting the carbon monoxide in said gas stream with iodine pentoxide to yield iodine vapor;
    conveying said iodine vapor directly to the cathode whereby said iodine vapor is reduced at the cathode; and
    measuring the current across the anode and cathode as a function of the level of carbon monoxide in said gas stream.
2. In a galvanic monitoring process for determining carbon monoxide in a sample gas stream, the steps comprising:
    providing a compartment with porous walls having the inner surface lined with a porous cathode structure formed of an inert conductive material;
    providing an anode selected from the group consisting of silver and mercury; joining said anode and the outer surface of said porous walls of said compartment with a stagnant aqueous electrolyte so that while said cathode is wetted by the electrolyte there is substantially no movement of the electrolyte at the cathode;

completely reacting the carbon monoxide in said gas stream with iodine pentoxide to yield iodine vapor;

conveying said iodine vapor directly to the cathode whereby said iodine vapor is reduced at the cathode; and measuring the current across the anode and the cathode as a function of the level of carbon monoxide in said gas stream.

3. In a galvanic monitoring process for determining the oxygen content of a compound, the steps comprising:

providing a porous cathode structure of inert conductive material and an anode selected from the group consisting of active carbon, silver and mercury, with said electrodes being joined by an electrolyte;

completely reacting the compound with carbon to form carbon monoxide;

thereafter completely reacting said carbon monoxide with iodine pentoxide to yield iodine vapor;

conveying said iodine vapor to the cathode whereby said iodine vapor is reduced at the cathode; and measuring the current generated in the process.

4. A galvanic cell adapted to monitor a sample gas stream containing carbon monoxide comprising:

a chamber for containing iodine pentoxide, said chamber having an inlet and an outlet;

heating means adjacent to said chamber for completely reacting the carbon monoxide in the gas stream with iodine pentoxide to yield iodine vapor;

a cell, a porous member dividing said cell into two separate compartments, one of said compartments being adapted to hold a stagnant body of an aqueous electrolyte and said porous member being disposed to contact the electrolyte to maintain the member permeated with the electrolyte;

an anode selected from the group consisting of silver and mercury disposed in said one of said compartments;

a porous cathode structure of inert conductive material disposed in the other of said compartments in contact with said porous member whereby the cathode is wetted by the electrolyte;

a duct connecting said outlet to said other of said compartments to permit the conveyance of iodine vapor to said other of said compartments; and means for connecting said anode and said cathode to a current measuring means.

5. A galvanic cell adapted to monitor a sample gas stream containing carbon monoxide comprising:

a chamber for containing iodine pentoxide, said chamber having an inlet and an outlet;

heating means adjacent to said chamber for completely reacting the carbon monoxide in the gas stream with iodine pentoxide to yield iodine vapor;

a cell, a first compartment of porous material disposed in said cell, the remainder of said cell providing a second separate compartment adapted to hold a stagnant body of an aqueous electrolyte and said first compartment being disposed to contact the electrolyte to maintain the porous material of the compartment permeated with electrolyte;

a porous cathode structure of inert conductive material disposed in said first compartment in contact with said porous material whereby said cathode is wetted by the electrolyte;

an anode selected from the group consisting of silver and mercury disposed in said second compartment;

a duct connecting said outlet to said first compartment to permit the conveyance of iodine vapor to said first compartment; and means for connecting said anode and said cathode to a current measuring means.

6. A galvanic cell as set forth in claim 5 including means for permitting the conveyance of gas from the interior of said first compartment to the atmosphere.

7. A galvanic cell as set forth in claim 6 including aspirator means for conveying a gas to be monitored through said chamber, through said duct connecting said chamber to said first compartment, and from said first compartment through said means for permitting the conveyance of gas to the atmosphere.

8. A galvanic cell adapted to monitor a sample gas stream containing carbon monoxide comprising:

a chamber for containing iodine pentoxide, said chamber having an inlet and an outlet;

heating means adjacent to said chamber for completely reacting the carbon monoxide in the gas stream with iodine pentoxide to yield iodine vapor;

a cell, a generally cylindrical compartment of porous material disposed within said cell, the remainder of said cell providing a second separate compartment adapted to hold a stagnant body of electrolyte and said cylindrical compartment being disposed to contact the electrolyte to maintain the porous material of the compartment permeated with electrolyte;

a cylindrical porous cathode structure of inert conductive material disposed in said cylindrical compartment and being in close contact with the walls thereof whereby said cathode is wetted by said electrolyte;

an anode selected from the group consisting of silver and mercury disposed in a portion of said second compartment;

a duct connecting said outlet to said cylindrical compartment to permit the flow of iodine vapor to said cylindrical compartment; and means for connecting said anode and said cathode to a current measuring means.

9. In a galvanic monitoring process for determining carbon monoxide in a sample gas stream, the steps comprising:

providing a porous cathode structure of inert conductive material and an anode formed of active carbon, said electrode being separated by a porous member in contact with said cathode;

joining the porous member and the anode with a stagnant aqueous electrolyte so that while said cathode is wetted by the electrolyte there is substantially no movement of the electrolyte at the cathode;

completely reacting the carbon monoxide in said gas stream with iodine pentoxide to yield iodine vapor;

conveying said iodine vapor directly to the cathode whereby said iodine vapor is reduced at the cathode; and measuring the current across the anode and cathode as a function of the level of the carbon monoxide in said gas stream.

10. In a galvanic monitoring process for determining carbon monoxide in a sample gas stream, the steps comprising:

providing a compartment with porous walls having the inner surface lined with a porous cathode structure formed of an inert conductive material;

providing an anode formed of active carbon;

joining said anode and the outer surface of said porous walls of said compartment with a stagnant aqueous electrolyte so that while said cathode is wetted by the electrolyte there is substantially no movement of the electrolyte at the cathode;

completely reacting the carbon monoxide in said gas stream with iodine pentoxide to yield iodine vapor;

conveying said iodine vapor directly to the cathode whereby said iodine vapor is reduced at the cathode; and measuring the current across the anode and cathode as a function of the level of carbon monoxide in said gas stream.

11. A galvanic cell adapted to monitor a gas stream containing carbon monoxide comprising;

a chamber for containing iodine pentoxide, said chamber having an inlet and an outlet;

heating means adjacent to said chamber for completely reacting the carbon monoxide in the gas stream with the iodine pentoxide to yield iodine vapor;
a cell, a porous member dividing said cell into two separate compartments, one of said compartments being adapted to hold a stagnant body of an aqueous electrolyte and said member being disposed to contact said electrolyte to maintain the member permeated with the electrolyte;
an anode formed of active carbon disposed in one of said compartments;
a porous cathode structure of inert conductive material disposed in the other of said compartments in contact with said porous member whereby said cathode is wetted by the electrolyte;
a duct connecting said outlet to said other of said compartments to permit the conveyance of iodine vapor to said other of said compartments; and
means for connecting said anode and said cathode to a current measuring means.

12. A galvanic cell adapted to monitor a sample gas stream containing carbon monoxide comprising:
a chamber for containing iodine pentoxide, said chamber having an inlet and an outlet;
heating means adjacent to said chamber for completely reacting the carbon monoxide in the gas stream with iodine pentoxide to yield iodine vapor;
a cell, a first compartment of porous material disposed in said cell, the remainder of said cell providing a second separate compartment adapted to hold a stagnant body of an aqueous electrolyte and said first compartment being disposed to contact the electrolyte to maintain the porous material of the compartment permeated with the electrolyte;
a porous cathode structure of inert conductive material disposed in said first compartment in contact with said porous material whereby said cathode is wetted by the electrolyte;
an anode formed of active carbon disposed in said second compartment;
a duct connecting said outlet to said first compartment to permit the conveyance of iodine vapor to said first compartment; and
means for connecting said anode and said cathode to a current measuring means.

13. A galvanic cell adapted to monitor a sample gas stream containing carbon monoxide comprising:
a chamber for containing iodine pentoxide, said chamber having an inlet and an outlet;
heating means adjacent to said chamber for completely reacting carbon monoxide in the gas stream with iodine pentoxide to yield iodine vapor;
a cell, a generally cylindrical compartment of porous material disposed within said cell, the remainder of said cell providing a second separate compartment adapted to hold a stagnant body of electrolyte and said cylindrical compartment being disposed to contact the electrolyte to maintain the porous material of the compartment permeated with electrolyte;
a cylindrical porous cathode structure of inert conductive material disposed in said cylindrical compartment and being in close contact with the walls thereof whereby said cathode is wetted by said electrolyte;
an anode formed of active carbon disposed in a portion of said second compartment;
a duct connecting the said outlet to said cylindrical compartment to permit the flow of iodine vapor to said cylindrical compartment; and
means for connecting said anode and said cathode to a current measuring means.

References Cited by the Examiner
UNITED STATES PATENTS

| | | | |
|---|---|---|---|
| 2,651,612 | 9/1953 | Haller | 204—195 |
| 2,805,191 | 9/1957 | Hersch | 204—1 |
| 2,851,655 | 9/1958 | Haddad | 204—195 |
| 2,861,926 | 11/1958 | Jacobson | 204—195 |
| 3,005,758 | 10/1961 | Spracklen et al. | 204—195 |
| 3,022,241 | 2/1962 | Jessop | 204—195 |
| 3,028,317 | 4/1962 | Wilson et al. | 204—195 |
| 3,038,848 | 6/1962 | Brewer et al. | 204—195 |
| 3,050,371 | 8/1962 | Dowson et al. | 204—195 |
| 3,051,631 | 8/1962 | Harbin et al. | 204—195 |

FOREIGN PATENTS 521,773  5/1940  Great Britain.

JOHN H. MACK, Primary Examiner.
WINSTON A. DOUGLAS, Examiner.
T. TUNG, Assistant Examiner.